United States Patent
Leiterman

(10) Patent No.: US 10,563,887 B2
(45) Date of Patent: Feb. 18, 2020

(54) AIR DUCT SYSTEMS AND METHODS OF AIR FLOW CONTROL

(71) Applicant: Leiterman and Associates, Inc., Spooner, WI (US)

(72) Inventor: Ryan Leiterman, Trego, WI (US)

(73) Assignee: Leiterman & Associates, Inc., Spooner, WI (US)

( * ) Notice: Subject to any disclaimer, the term of this patent is extended or adjusted under 35 U.S.C. 154(b) by 383 days.

(21) Appl. No.: 15/360,098

(22) Filed: Nov. 23, 2016

(65) Prior Publication Data

US 2017/0074542 A1 Mar. 16, 2017

Related U.S. Application Data

(63) Continuation of application No. 14/825,637, filed on Aug. 13, 2015, now Pat. No. 9,599,362.

(60) Provisional application No. 62/184,769, filed on Jun. 25, 2015.

(51) Int. Cl.
*F24F 13/02* (2006.01)
*F24F 7/06* (2006.01)

(52) U.S. Cl.
CPC ............ *F24F 13/0236* (2013.01); *F24F 7/06* (2013.01); *F24F 13/0218* (2013.01)

(58) Field of Classification Search
CPC ...... F24F 13/0236; F24F 13/0218; F24F 7/06; A01K 1/0047; A01K 1/0052
USPC .................................................. 454/297, 903
See application file for complete search history.

(56) References Cited

U.S. PATENT DOCUMENTS

| | | | | |
|---|---|---|---|---|
| 5,655,963 A * | 8/1997 | Paschke | ................ | F24F 13/068 454/297 |
| 6,899,615 B2 * | 5/2005 | Gebke | .................. | B01D 46/008 454/306 |
| 7,442,121 B2 * | 10/2008 | Cassidy | .............. | F24F 13/0218 138/113 |
| 8,808,075 B2 * | 8/2014 | Gebke | ....................... | B32B 3/10 138/118 |
| 9,925,487 B1 * | 3/2018 | Reed | ....................... | B01D 46/02 |
| 2003/0194965 A1 * | 10/2003 | Paschke | ............ | F16L 55/02718 454/306 |

(Continued)

*Primary Examiner* — Gregory L Huson
*Assistant Examiner* — Dana K Tighe
(74) *Attorney, Agent, or Firm* — Anthony J. Bourget

(57) ABSTRACT

An air control system 20 and associated methods including a flexible duct 30 having air exit holes 40, 42 and a flexible liner 50, 60 sheet within the duct 30 and extending longitudinally along the duct, the liner 50 sheet having opposite longitudinal edges 52, 54 connected to the duct 30 along the longitudinal length of the duct 30, the liner 50 sheet being permeable in one aspect and regulating air flow through the exit holes 40, 42 when the sheet is pressed against the portion of the duct having the exit holes. The duct 30 may also have multiple liner sheets 50, 60 arranged end-to-end and/or layered in various duct segments such that the different liners may be independently controlled to regulate the outflow of air from the duct as desired. The duct having a liner which closes or inhibits air flow from the exit holes may also be rotated to accommodate use of a single duct for different seasons and where the internal liner adjusts to assist with the downward control of air flow based on alignment of various perforations with the different exits holes.

24 Claims, 15 Drawing Sheets

(56) References Cited

U.S. PATENT DOCUMENTS

| | | | |
|---|---|---|---|
| 2004/0229559 A1* | 11/2004 | Gebke | F24F 13/0218 454/306 |
| 2006/0070521 A1* | 4/2006 | Stark | F24F 13/0218 95/45 |
| 2006/0252365 A1* | 11/2006 | Gebke | F24F 13/0209 454/306 |
| 2008/0113610 A1* | 5/2008 | Brown | F24F 13/0218 454/339 |
| 2009/0221226 A1* | 9/2009 | Gebke | F16L 11/02 454/297 |
| 2011/0269390 A1* | 11/2011 | Pinkalla | F16L 11/02 454/284 |

\* cited by examiner

AIR DUCT SYSTEMS AND METHODS OF AIR FLOW CONTROL

CROSS-REFERENCE TO RELATED APPLICATIONS

This application is a continuation-in-part and claims the benefit and priority of co-pending U.S. patent application Ser. No. 14/825,637 filed on Aug. 13, 2015, which claims priority to Provisional Patent Application Ser. No. 62/184,769 filed Jun. 25, 2015, for AIR DUCT SYSTEMS AND METHODS OF AIR FLOW CONTROL, incorporated herein by reference in its entirety for continuity of disclosure.

BACKGROUND OF THE INVENTION

1. Field of the Invention

The present invention relates to air ducts having openings to allow air to flow from the duct, and more particularly to flexible air ducts, systems and methods which utilize flexible internal membrane structures in conjunction with a duct.

2. Background Information

Fabric ducts made from a sewn, pliable material have gained popularity as an inexpensive conduit to move air when compared to the more expensive, traditional sheet metal ductwork. A blower at the inlet of the duct is activated to supply air as needed. The air discharged from the blower inflates or travels through the duct to create a radially expanded tubular conduit that conveys the air the length of the tube. The pliable wall of the tube may be perforated along a length of the tube for dispersing air from within the duct into the areas being ventilated. Pliable air ducts are often suspended from a horizontal cable or track mounted just below the ceiling of a building.

Air ducts and systems having a pliable wall with perforations or permeable spaces to allow air to escape the duct are known. Also known are air ducts which include an internal membrane or liner which controls the direction of flow of the air. An example of an air control system having an inner membrane within a fabric duct can be found in U.S. Pat. No. 5,111,739. While such patented air flow controls and other systems may have useful features, there is room for improvement.

SUMMARY OF THE INVENTION

Applicant has recognized that present air duct systems are not effective or are inefficient for use in varying environmental conditions. Deficiencies are especially prevalent where a duct system is utilized in an agricultural application. While it is known to use an air duct system to vary the flow of air depending on the season (such as projecting air downward from the duct during warm or hot weather and providing air upward from the duct in cool or cold weather), such systems are not versatile for adjusting to the ever-changing and wide variety of conditions encountered in many applications, and especially in an agricultural setting. Applicant has recognized that the ventilation requirements of livestock are a function of multiple parameters, including, for instance: the species of livestock in the building, their age, size and animal stocking density, housing conditions, both internal and ambient temperature and humidity, airborne bacterial concentration and noxious gas (ammonia) concentration, among other criteria. The volume and velocity of fresh air reaching the livestock that is required to adequately ventilate the barn varies throughout the day. Often the ventilation requirements for different sections of the livestock facility vary throughout the day, independently from each other. When livestock facility managers cannot easily adjust the ventilation system to match the current environmental conditions for each section of the facility, the ventilation system is left unadjusted and the livestock are exposed to either inadequate or excessive ventilation rates, both of which negatively affect the health and production of the animals. Applicant has created a system which easily and independently controls the volume and velocity of air delivered from a fabric duct. Heretofore there has been no rotation of a duct containing an inner adjustable liner, whether the liner was solid or permeable. The nature of ventilation for each section of the facility may be adjusted as needed and to match desired ventilation requirements. In one aspect the system is used to easily and independently control volume and velocity of air delivered from a fabric duct to various sections of the facility or barn. The same may be used in an office, commercial, residential or other setting.

Applicant has created a system which accommodates a wide variety of situations and where the environment may be easily controlled. To obtain the effectiveness and control of the environment would typically require use of multiple air duct systems to be installed. Heretofore unrecognized is that a single duct system may be configured to provide various airflow volumes and velocities to meet the desired ventilation rates based on ventilation requirements and the ventilation manager's goals.

In one aspect the invention includes a duct system where the duct includes exit holes and an internal membrane or liner or baffle which is permeable. The liner may be porous or perforated such that part of the liner restricts flow of air though exit holes while also allowing some air, albeit reduced, to flow through the exit holes.

In a further aspect the invention includes use of discrete or multiple liner sections within the duct. In one aspect the liner segments are oriented end-to-end and selectively adjustable to open/close or regulate exit holes of a segment of the duct. In one aspect the liner segments are permeable or porous or include perforations and in other aspects the liner segments are impermeable. The discrete sections may be independently adjusted. The discrete sections may be independently adjusted manually, or automatically based on sensor data.

In a further aspect the invention includes use of discrete or multiple liners which are layered in the duct or within a duct segment. The liners may or may not be porous or may or may not include perforations. The liners are individually adjustable to control the flow at a particular duct segment or section. The liners may be layered to accommodate different air flow goals. In a further aspect, multiple liners are layered and also positioned end-to-end. In some aspects the liner or liners of the invention are utilized with ducts that are solid or rigid.

An air flow control system having a fabric duct with internal adjustable liner, such as that shown in U.S. Pat. No. 5,111,739, has been used to adjust the flow of air from the duct from an upward direction to a downward direction, and vice versa. Such baffle duct device eliminated the need to disconnect, flip or rotate, and then reconnect the duct. For instance, adjusting the internal baffle eliminated the need to rotate the duct from season-to-season (or from hot/warm condition to cold/cool condition). Such duct having the adjustable internal membrane was created specifically to avoid the need to flip the duct. Heretofore such baffle ducts have been maintained in place without flipping because there was no need to do so and no recognition of a benefit of such flipping (because the upward/downward adjustment was done easily with the adjustable internal baffle). In one aspect of the invention it is Applicant who appreciated that rotating or flipping a duct having an internal adjustable liner, despite the presence of the internal liner, results in an improved system and the ability to accommodate a greater range of conditions. Incorporating exit holes or sets of exit holes of varying configurations on a duct having an internal liner and configured for rotating or flipping the duct accommodates greater uses and conditions.

In a further aspect the invention includes a method of rotating a duct having an internal membrane. In one aspect the duct includes several small holes used to deliver low volume and low speed air to livestock (or to the target area in general) so as to meet both volume and velocity requirements for cold weather ventilation. In a further aspect the duct is configured for summer applications where fewer, larger holes are used to deliver high volume and high speed air to the livestock so as to meet both volume and velocity requirements or needs for warm weather ventilation. By adjusting the liner member while also rotating the duct to adjust or select a desired downward facing hole (or opening) pattern, an operator is better able to accommodate ventilation of livestock (or the target area in general) over a wide range of seasonal temperatures while utilizing a single duct.

Aspects of the invention present added and unexpected benefits in the regulation of air flow, especially in an agricultural environment, such as increased livestock comfort due to controlled temperature/humidity and air flow, together with fly repellant or nuisance reduction aspects and dry or dryer livestock bedding with anticipated cost savings and overall health benefits.

The above partial summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

Figure 1:
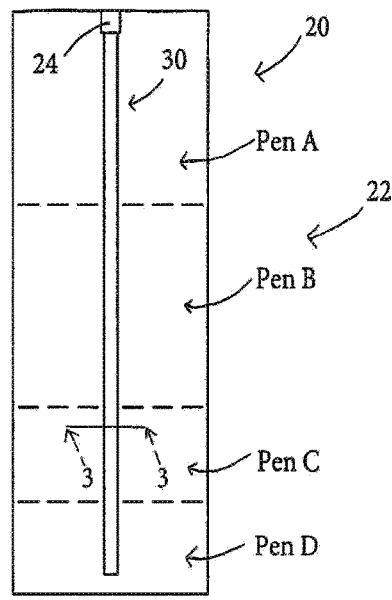
FIG. 1 is top view of an air flow control system in accordance with one aspect of the present invention with a top of a facility removed for clarity.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-21, aspects of the systems, ducts and methods are shown. In one aspect, air flow control system 20 includes a duct 30 positioned in a facility 22 such as a building, barn or other location to receive air flow or air treatment. In one aspect duct 30 is an elongated cylindrical flexible duct which spans a length of the facility 22. The duct 30 may span a portion or substantially the entirety or entirety of the facility 22. Multiple ducts 30 may be utilized. In one aspect facility 22 is a barn which may house livestock such as cows, calves, pigs, goats, etc. Facility 22 is not limited to a barn and may include an office structure, residence, commercial building, industrial structure, outdoor environment or other facility. Duct 30 may span across various pens of the barn to deliver a stream or flow of air represented by arrow A or arrow A' in FIG. 2. Duct 30 includes air exit holes 40 which allow the flow of air from blower or fan unit 24 to be directed outward from duct 30 toward a desired region or space, such as directed toward an animal pen or other area of a facility 22. As air travels longitudinally through duct 30 the air exits through various holes or permeated aspects of the duct 30. In one aspect duct 30 may be made of high density polyethylene material. Exit holes 40 may be prepared by laser cutting or other methods.

Figure 3:
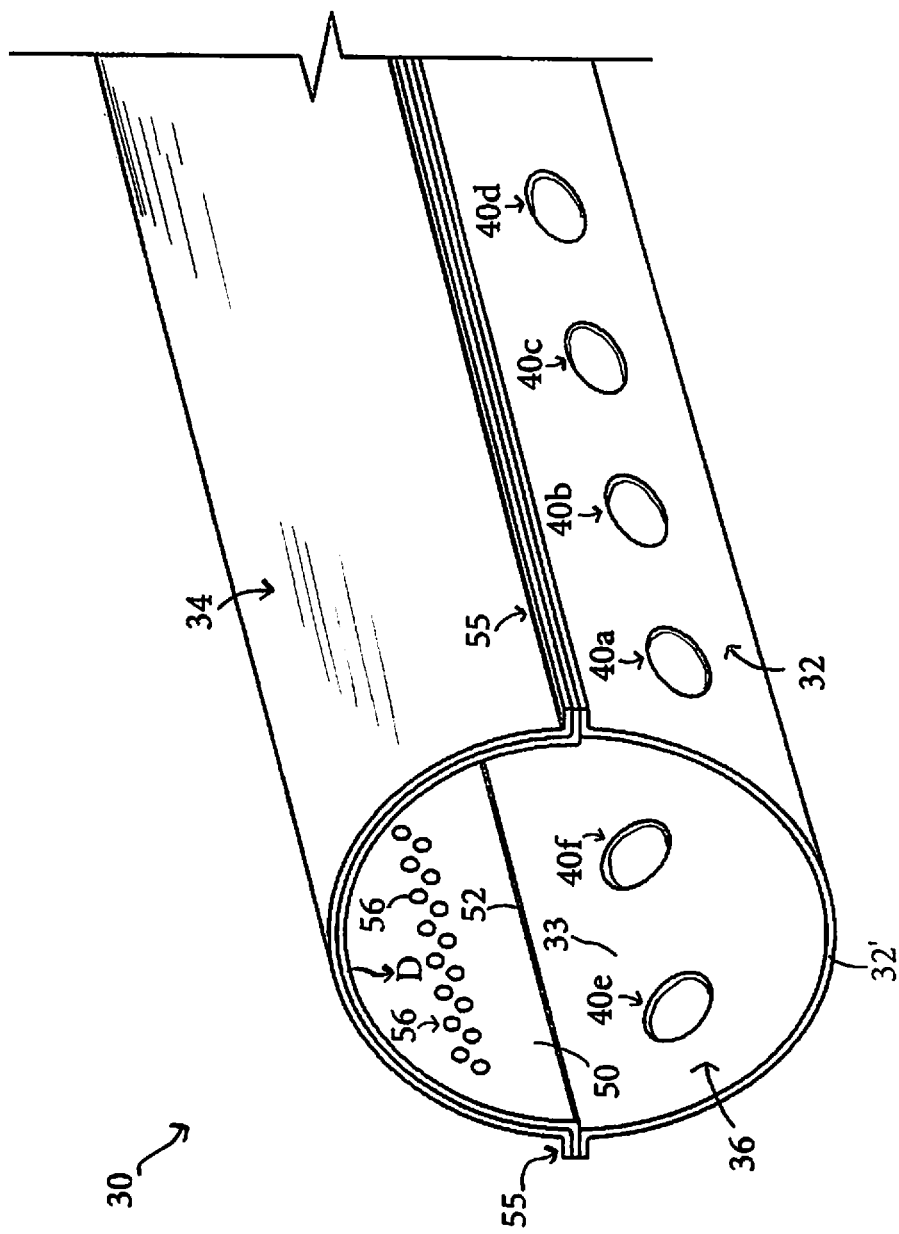
FIG. 3 is a partial perspective section view of a duct component in accordance with one aspect of the invention and taken generally along line 3-3 of FIG. 1.

As shown in FIG. 3 duct 30 is an elongated cylindrical flexible duct which may be made of fabric or plastic or other pliable material. FIG. 3 is shown without connecting hooks (i.e., hooks to connect the duct to the facility). Duct 30 may be suspended from a roof of the facility and may include suspension cables and hooks or other means of suspending the duct in the facility 22. Duct 30 includes a flexible membrane or liner 50 which extends longitudinally along and through duct 30. Liner 50 includes opposite longitudinal edges 52, 54 connected to the duct 30. In one aspect edges 52, 54 are connected at a seam 55. The seam 55 may run the longitudinal length of duct 30 or a portion of the duct 30. Seam 55 may be created by stitching or gluing or otherwise connecting a first portion 32 with a second portion 34. The liner 50 may be positioned at seam 55 between first portion 32 and second portion 34. The liner 50 may also be intermittently connected to duct 30. In one aspect liner 50 has a width which is at least equal to half the circumference of the duct 30. Liner 50 aligns flat or layers against an inner surface of duct 30.

In one aspect, duct 30 includes a first portion 32 having exit holes 40. Exit holes 40 may be of any size or desired shape and may be arranged in any desired pattern. A single row or set of holes 40 may be provided or multiple rows of holes 40 such as shown in FIG. 3 may be used. The pattern of holes 40 shown in FIG. 3 are arranged generally in a line and generally at about 5:00 (40*a*, 40*b*, 40*c*, 40*d*) and 7:00 (40*e*, 40*f*) on the circumferential clock dial where the top portion of duct 30 represents 12:00. It may be appreciated that other orientations may be used as desired. Liner 50 is positioned against the inner surface of duct 30 at second portion 34. In this arrangement liner 50 is in an upward position. In such position liner 50 in part defines a first longitudinal compartment 36 within duct 30. Compartment 36 is oriented between liner 50 and first portion layer 32' and spans longitudinally along duct 30 or along at least a segment of duct 30. In one aspect liner 50 is made from plastic, such as high density polyethylene material. It may be appreciated that perforations may be formed by laser cutting. It may also be appreciated that liner 50 may be permeable without having to create holes or perforations due to use of material that is already permeable.

In one aspect of the invention liner 50 is permeable. Liner 50 may be made of a permeable material which is also flexible so that liner 50 forms to the inner contour of duct 30. In one aspect the material of liner 50 has a natural permeability. In one aspect liner 50 includes perforations 56. As shown in FIG. 3 perforations 56 may span a length of liner 50. It may be appreciated that perforations 56 may be of a size and/or desired shape and arranged in a desired pattern so that air flows through liner 50 to achieve a desired flow. A single row or set of perforations 56 may be provided or multiple rows of perforations such as shown in FIG. 3 may be used. Perforations 56 may be spaced apart from adjacent perforations as desired. The pattern of perforations 56 shown in FIG. 3 are arranged generally in a double-line and generally at about 10:00 and 2:00 on the dial where the top portion of duct 30 represents 12:00. It may be appreciated that other orientations of perforations 56 may be used as desired.

Figure 4:
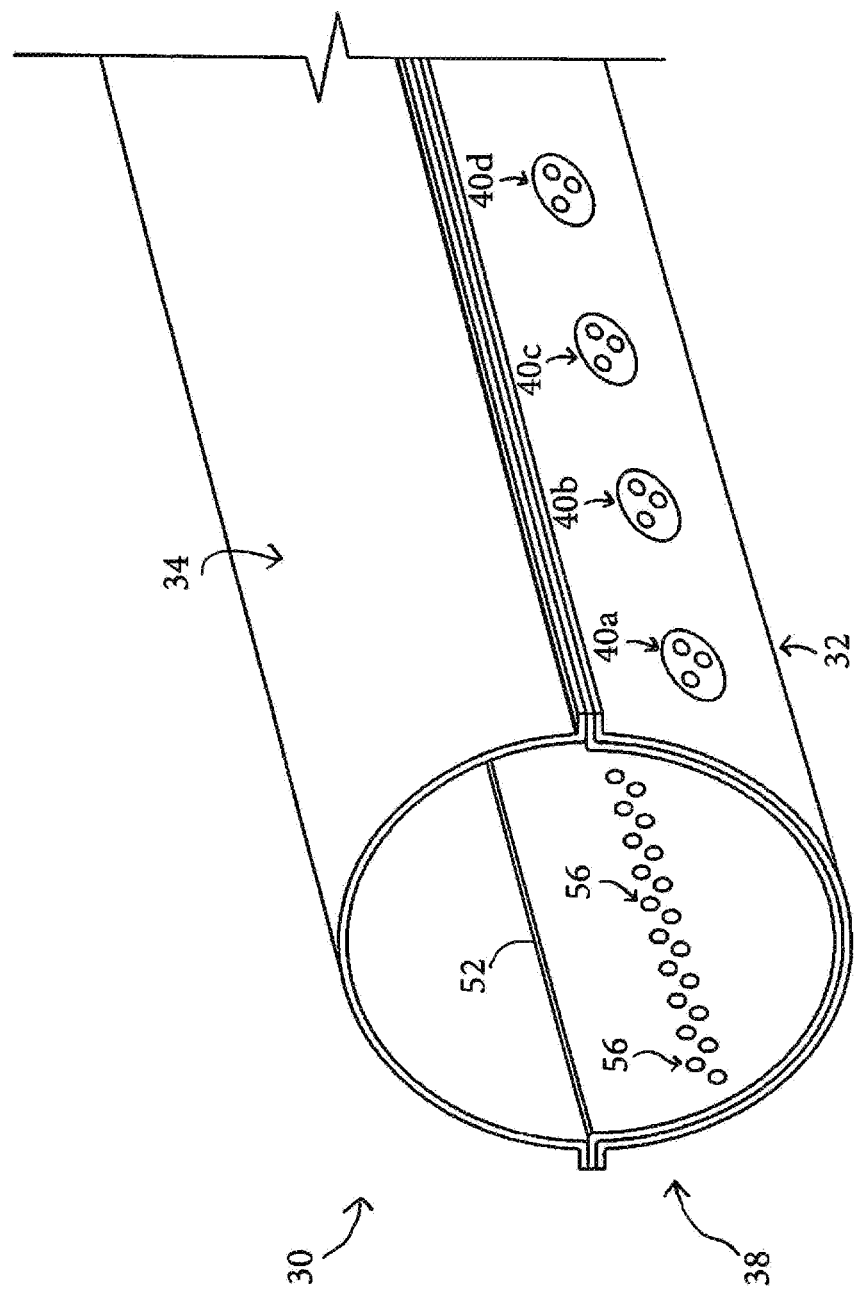
FIG. 4 is a partial perspective section view of a further aspect of the invention.

Liner 50 may be adjusted to a downward position as shown in FIG. 4. For instance, liner 50 may be adjusted by pulling down a leading edge or area of liner 50 which edge or area is positioned proximal to fan or blower 24. Pushing or urging liner 50 in the direction shown by arrow "D" in FIG. 3 will cause flowing air from fan 24 to enter the second longitudinal compartment 38 and assist or force the remainder of liner 50 to press against first portion inner surface 33, resulting in liner 50 oriented as shown in FIG. 4. The liner 50 may also be adjusted in reverse, i.e., moved from a lower position as in FIG. 4 to an upper position as in FIG. 3. When liner 50 having perforations 56 is positioned against first portion 32 the respective perforations may align with air exit holes 40. In one aspect perforations 56 are smaller as compared to exit holes 40 such that air may continue to flow through first portion 32 of duct but at a reduced rate and/or volume. In further aspects non-perforated holes within liner 50 (i.e., holes which provide liner 50 with a natural permeability) allow air to continue to flow through the duct but at a reduced rate and/or volume. Liner 50 will partially obstruct hole 40. A single perforation 56 may align with an exit hole 40 to reduce the flow of air through hole 40. One or more or several perforations 56 may align with an exit hole 40. In one non-limiting example, an exit hole 40 or series of exit holes 40 may be 4 inch diameter holes with a perforation 56 (and/or a non-perforated hole) being 2 inch diameter holes which align with holes 40 (thereby reducing the 4 inch exit hole 40 to a 2 inch exit hole 56). It may be appreciated that perforations 56 may be designed to align directly with exit holes 40 or may align in part or not at all with a hole 40. A perforation 56 which aligns in part with exit hole 40 will partially reduce the flow of air through hole 40.

Figure 5:
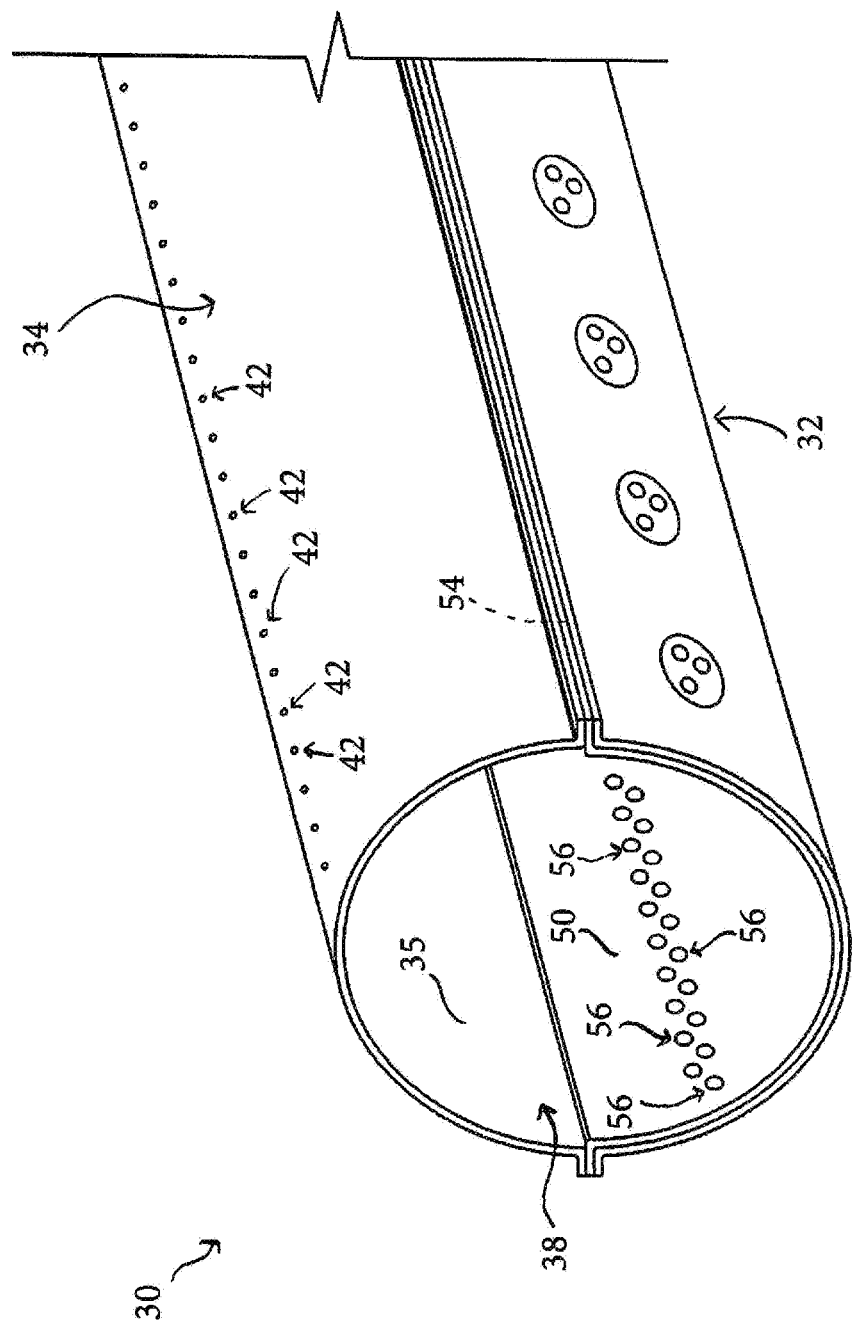
FIG. 5 is a partial perspective section view of a further aspect of the invention.

In a further aspect duct 30 includes air exit holes 42 at second portion 34 such as shown in FIG. 5. In this aspect holes 42 are oriented generally at the top of duct 30. In one aspect holes 42 may be positioned in line at 12:00. It may be appreciated that holes 42 may be of any size or dimension and arranged in a desired pattern. Multiple lines of holes 42 may also be uses and may be oriented at other dial angles such as at 1:00 or 11:00 or other angle. It may be appreciated that holes 42 may assist with condensation reduction or prevention by allowing a small amount of air to escape and surround a top portion of duct 30 to better equalize surface temperatures to reduce or prevent condensation on the outside of duct 30. In one aspect it may be appreciated that a perforation 56 or holes 56' may have an opening or diameter equal to or greater than an opening or diameter of an exit hole 40, 42. In some aspects while the opening or diameter of perforation 56 or holes 56' is equal to or greater than an opening or diameter of an exit hole 40, 42, the positioning of the liner 50 is such that there may or may not be an influence on the air flow exiting the air exit hole 40, 42. It may be appreciated that perforations 56 or holes 56' may be configured of equal size, shape and spacing (or of differing sizes, shapes and spacing). It may be appreciated that an exit hole 42 or exit holes 42 may also be larger than a perforation 56 or perforations 56. Holes 42 may span the length of duct 30 (or a portion of duct 30) as desired. Perforations 56 may span the length of liner 50 (or portion of liner 50) as desired. In further aspects holes 40, 42 and perforations 56 (and/or non-perforated holes) are irregular in shape and do not have a defined diameter.

In further reference to the figures including FIG. 3 and FIG. 5, in addition to adjustment of liner sheet 50 within duct 30, the duct 30 itself may be rotated. For instance duct 30 may be rotated or flipped such that first portion 32 is oriented upwards and second portion 34 is oriented downward, or vice versa. Moreover, a dominant flow of air (dominant airflow) exiting duct 30 may be maintained in a first general direction, even upon rotating or flipping duct 30. In one aspect, the first general direction of dominant airflow from duct 30 is in a downward direction. For instance, air flow may be dominant through exit holes 40 of first portion 32 (i.e., and in a downward direction) as compared to air flow through exit holes 42 of second portion 34, such as the case where air exit holes 40 allow a greater exit flow of air compared to flow of air through exit holes 42. The characteristics of the air flowing through the air exit holes 40 will typically be different compared to the characteristics of air flowing through air exit holes 42. For instance, a first set of air flow characteristics (i.e. in terms of volume of flow, direction of flow, and intensity of flow) will be associated with the flow of air exiting holes 40, whereas a second set of air flow characteristics will be associated with the flow of air exiting holes 42. Changing the size, spacing and number of holes 40, 42 will impact the characteristics of air exiting the duct 30 at the respective duct portions. The air flow characteristics will also be changed or can be altered given the nature of and/or positioning of liner 50 in relation to the exit holes 40, 42. When liner 50 is pressed against the inside of second portion 34, a relatively great or dominant flow of air exits through holes 40 compared to a relatively small and non-dominant flow of air exiting holes 42. A dominant flow of air is an amount greater than 50 percent of the total flow of air exiting duct 30. The predominant flow of air is also the flow of air that is dominant or is the primary flow. The direction of dominant air flow is that direction where the air flow is most dominant. In further aspects, the invention includes use of a liner 50 within a rotatable duct 30 to maintain a consistent direction of dominant airflow. Maintaining such consistent direction of general airflow is accomplished while also influencing air flow factors such as the volume and velocity of air exiting the exit holes 40, 42.

Maintaining the consistent general direction of predominant airflow while altering the airflow characteristics exiting duct 30 is accomplished in various aspects of the invention. In one aspect, duct 30 contains a flexible liner sheet positioned within and extending longitudinally along the duct, the liner sheet having opposite longitudinal edges connected to the duct, the liner sheet in part defining a first longitudinal compartment and a second longitudinal compartment within the duct such that air directed longitudinally along the first longitudinal compartment escapes through the air exit holes 40 or along the second longitudinal compartment to force the liner sheet in substantial contact with an inner surface of the first portion of the duct, allowing air to escape through air exit holes 42. Air exit holes 40, 42 are different in their configuration (i.e., size, pattern, amount). Liner sheet 50 within duct 30 can be positioned such that liner sheet 50 allows the predominant airflow to escape through air exit holes 40 while restricting (either completely or partially) airflow through air exit holes 42, or vice versa. Liner 50 may be adjusted such that air flows along either the first longitudinal compartment or along the second longitudinal compartment. In one instance liner 50 is adjusted such that airflow passing through exit holes 40 is a predominant airflow exiting duct 30, or adjusted such that airflow passing through exit holes 42 is the predominant airflow exiting duct 30. In one aspect, utilizing liner 50, whether airtight or substantially airtight, results in a change of direction of the predominant airflow exiting the air exit holes. In order to maintain the predominant airflow direction exiting the air exit holes (such as in a generally downward direction), duct 30 is rotated with a corresponding adjustment of liner 50. Such rotation of duct 30 and adjustment of liner 50 alters the dynamics of airflow exiting the air exit holes 40, 42, while also maintaining the direction of predominant airflow from duct 30. Maintaining the direction of predominant airflow may also be accomplished with a permeable liner 50 whether or not rotating the duct 30.

In yet a further aspect, a permeable liner 50 within a duct 30 having air exit holes 40, 42 with different configurations, in a top and bottom orientation and with the liner 50 configured with perforations 56 or liner holes 56' may be adjusted from an upward orientation to a downward orientation (and vice versa) while continuing to maintain the direction of predominant airflow exiting the air exit holes. Use of a liner 50 having sufficient permeability will allow for maintaining the predominant airflow in the first general direction (i.e., downward if desired) despite the liner 50 at least partially impeding air flow through exit holes 40. In this aspect, duct rotation is not needed to achieve different airflow characteristics exiting duct 30 while maintaining the predominant airflow direction of air exiting the air exit holes.

In a further aspect duct 30 has air exit holes 40 on only one side or at one portion of the duct and contains a flexible liner sheet 50 having perforations positioned within and extending longitudinally along the duct 30, the liner sheet having opposite longitudinal edges connected to the duct, the liner sheet 50 in part defining a first longitudinal compartment and a second longitudinal compartment within the duct such that air directed longitudinally along the first longitudinal compartment escapes through the air exit holes 40 or along the second longitudinal compartment to force the liner sheet in substantial contact with an inner surface of the first portion of the duct 30. Adjusting the position of liner 50 within duct 30, having air exit holes 40 on only one side or at one portion of duct 30, will alter the airflow characteristics exiting exit hole 40 while maintaining the direction of predominant airflow.

Figure 6:
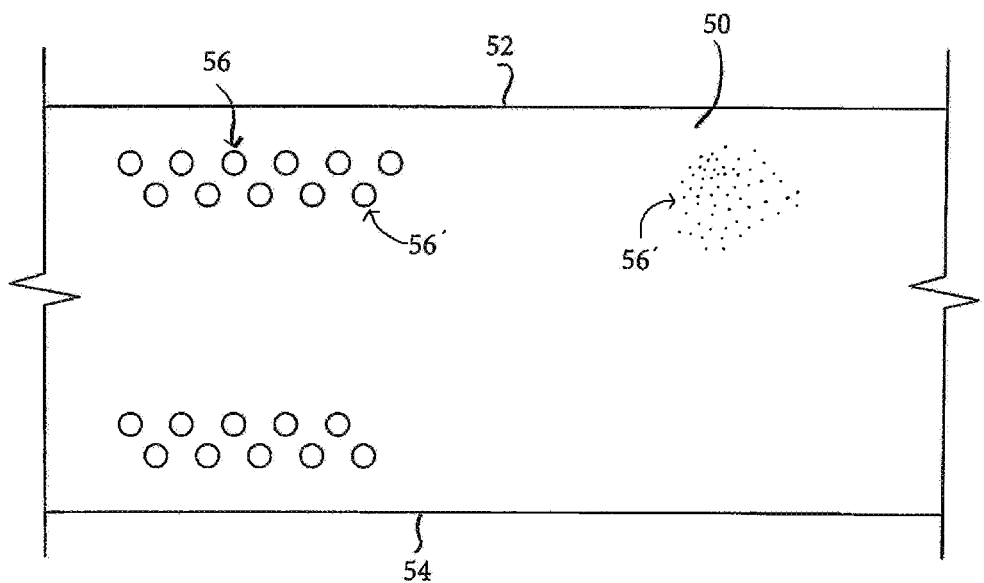
FIG. 6 is a top view of a component for use in one aspect of the invention.
Figure 7:
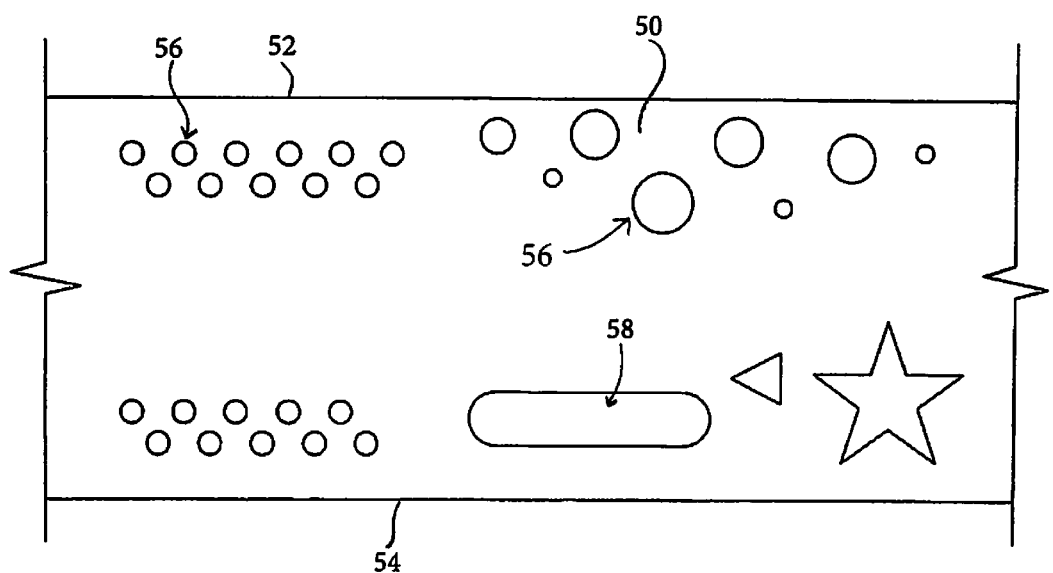
FIG. 7 is a top view of a component for use in one aspect of the invention.

FIG. 6 shows a top view of one aspect of a liner 50. In one aspect liner holes 56' are shown. Holes 56' in some instances are perforations 56 made within liner 50 and/or may be naturally formed holes or spaces which allow liner to be permeable. It may be appreciated that a perforation 56 or perforations 56 may be positioned adjacent other perforations 56. Holes 56' and perforations 56 may be of many different varieties and locations. A mixture of different types of holes 56' may be used. As shown in FIG. 7 one aspect of different varieties may be used. An elongated perforation 58 may extend so that it overlays several holes 40. It may be appreciated that different types and sizes and shapes of perforations may be used with liner 50, and the patterns and shapes and sizes and locations may vary as desired. The end of duct 30 may include an exit hole 40 or holes 40 and may or may not be configured with a liner 50 to control air flow out the end of duct 30. In one aspect a liner 50 may terminate prior to an end of duct 30. It may also be appreciated that to balance static pressure within duct 30 and to accommodate for varying the volume of air exiting duct 30 that various release holes may be included in duct 30, including openings at the end or at an end cap. In one aspect perforations may comprise alpha-numerical characters or other design, advertising, logo or artwork.

Figure 8:
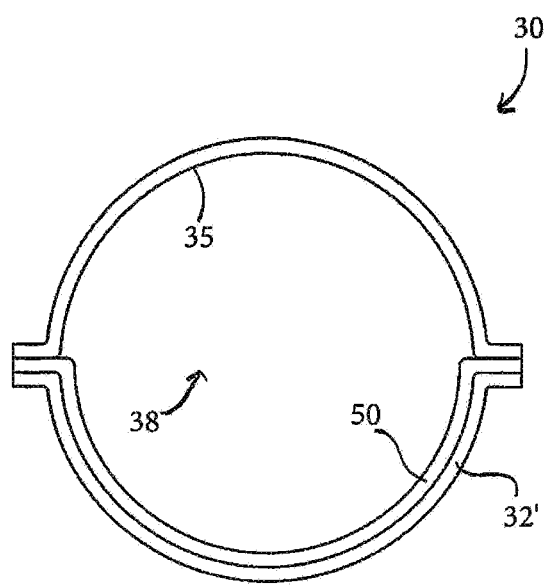
FIG. 8 is a section view of a further aspect of the invention.

FIG. 8 shows a section view of the duct 30 of FIG. 5. Liner 50 is pressed against first portion layer 32'. Second longitudinal compartment 38 is defined in part by liner 50 and second portion inner surface 35. The thicknesses of liner 50 and duct 30 are shown for illustrative purposes. It may be appreciated that various thicknesses of liner 50 and the walls or layers of duct 30 may vary as desired. The thickness of liner 50 need not be the same as the thickness of the walls or layers of duct 30.

Figure 9:
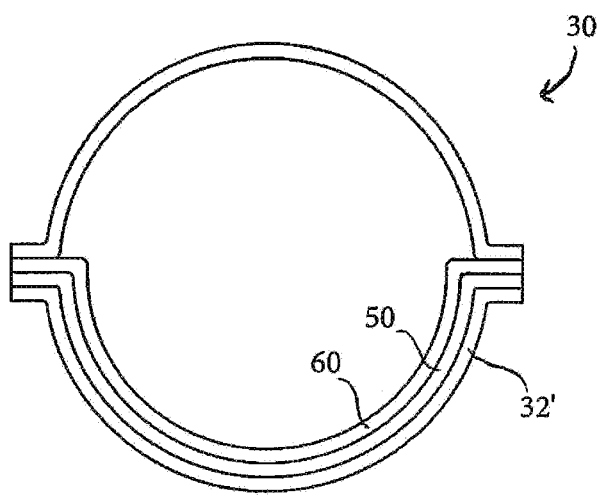
FIG. 9 is a section view of a further aspect of the invention.
Figure 10:
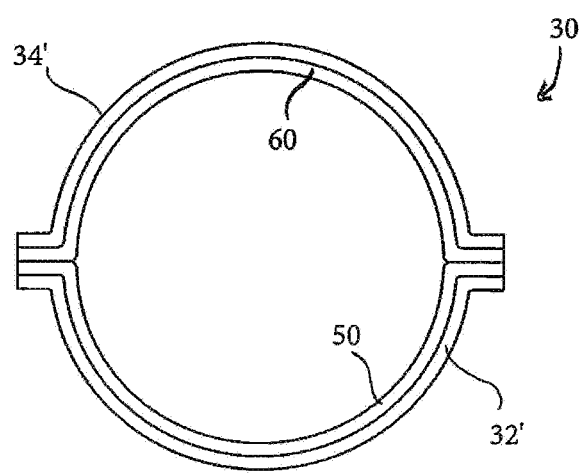
FIG. 10 is a section view of a further aspect of the invention.

In a further aspect of the invention and with respect to FIG. 9, a second liner 60 is configured within duct 30. In one aspect liner 60 is oriented against liner 50. Liner 60 may be forced or pressed against liner 50 by air traveling through duct 30. Liner 60 may be made of identical material (or different material) as is liner 50. Liner 60 may be a continuous flexible non-permeable sheet if desired. It may be appreciated that liner 60 may also be permeable. Liner 60 may also be perforated. Liner 60 may include perforations 56 which align with perforations 56 of liner 50 and with exit holes 40, 42. It may be appreciated that a permeable liner 50, 60 may comprise a composite plastic material or fabric material or combination of the same. It may be appreciated that liner 50, 60 may be permeable without being perforated. Additional or multiple liners 50, 60 may be layered together in duct 30. FIG. 10 shows a section view of a further aspect of duct 30 where liner 60 is independently operable as compared to liner 50. It may be appreciated that liner 50, 60 may be adjusted by various mechanism. In one aspect liner 50 may be connected to a movable stick 57 or plunger which allows an operator to push or pull the stick to raise or lower liner 50. Other mechanisms may be used to raise or lower liner 50, 60.

Figure 11:
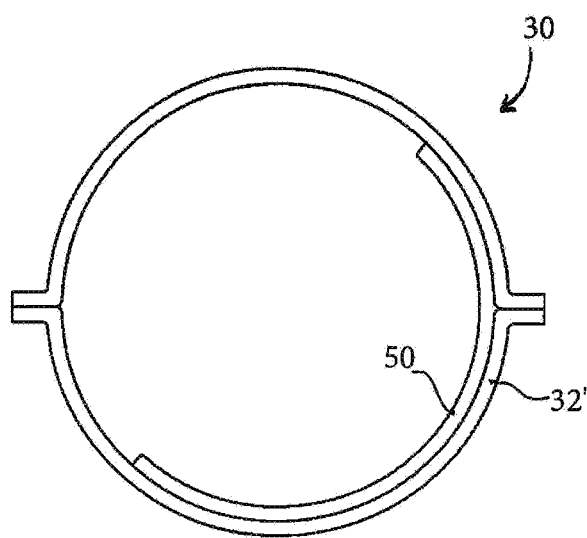
FIG. 11 is a section view of a further aspect of the invention.

FIG. 11 shows a section view of a further aspect of duct 30 where liner 50 is off-set or shifted. In one aspect the mid-point of liner 50 may be oriented generally at the 4:00 position (as shown) or at the 10:00 position. Other positions may be used. It may be appreciated that with such adjusted orientation the air may be angled or directed differently and to accommodate a wider range of options. Adjusting the orientation of the liner 50 will allow for different positioning and designs or patterns of exit holes. Stick 57 may also be adjusted automatically based on sensor data and in response to a control or actuator.

The liner 50 as generally shown in FIGS. 8-11, for instance, has a width that is equal to one half, or at least equal to one half, the inner circumference of duct 30. In one aspect the liner is slightly wider than it would need to be to lie precisely congruent with the inner surface of the duct wall so that liner 50 actually contacts the inner surface. The width of liner 50 may also be slightly wider to accommodate a seam allowance for connection to duct 30. In further aspects the liner 50 may have a width that is less than one half the circumference of duct 30 or a width that otherwise cause liner to span less than one half the inner circumference of duct 30. Thus, when the liner 50 having the lesser width is adjusted, the liner 50 will not contact or completely lie against the inner surface of the duct wall in the adjusted mode but will contact or lie against the inner surface of the duct wall in a non-adjusted mode. In further aspects, at least two liners 50 having a width that spans less than one half the inner circumference of duct 30 may be used. In one aspect three or more liners 50 having width that spans less than one half the inner circumference of duct 30 may be used. Each separate liner may be controlled independently of each other or may be connected for control or adjustment as a group. In these and other aspects the longitudinal edges 52, 54 of the liner need not correspond identically with the seams 55 of the duct. It may also be appreciated that in these and other aspects duct 30 may be seamless or may have a single seam or multiple seams 55 including more than two seams. Liner 50 may be sewn into duct 30 at a seam or glued or zipped or snapped or otherwise connected into duct 30. Seams 55 are typically used to connect first portion 32 of duct 30 to second portion 34 of duct 30. In one aspect seam 55 is used to connect liner 50 to duct 30. Liner 50 may connect to duct 30 at locations or at a seam which is independent of seam 55.

Figure 12:
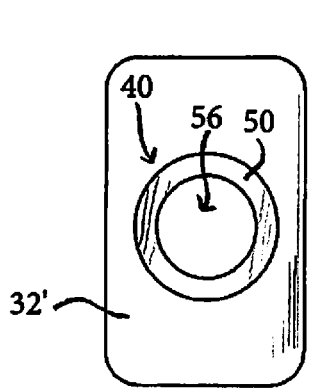
FIG. 12 is a partial bottom view of a component for use in one aspect of the invention.

FIG. 12 shows a portion of duct 30 with flexible layer 32' having an exit hole 40. Inside duct 30 is positioned liner 50 which includes a perforation 56 which allows air to pass through perforation 56 and at least a portion of exit hole 40. In this example perforation 56 aligns entirely within exit hole 40. It may be appreciated that perforation 56 may align with only a portion (or none) of exit hole 40.

Figure 13:
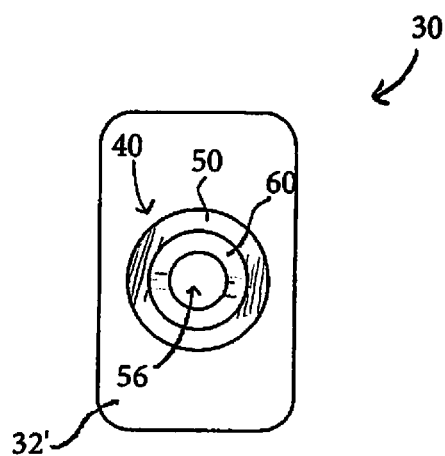
FIG. 13 is a partial bottom view of a component for use in one aspect of the invention.
Figure 14:
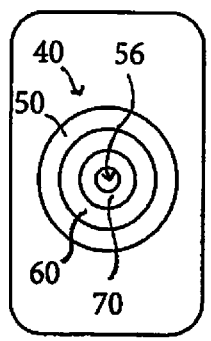
FIG. 14 is a partial bottom view of a component for use in one aspect of the invention.

FIG. 13 shows a further aspect where second liner 60 is also provided (corresponding generally with FIG. 9 showing two liners) so that perforation 56 of liner 60 aligns with perforation 56 of liner 50 and with exit hole 40. Here again it may be appreciated that perforation 56 of liner 60 may align with a portion (or none) of the other perforations or exit hole 40. FIG. 14 shows yet a further example of use of multiple liners. In this instance a third liner 70 includes a perforation. It may be appreciated that perforations 56 may also be larger than exit hole 40 or other perforations of different liners.

In one aspect with respect to FIGS. 12-14, an exit hole 40 may include a 6 inch diameter hole in the outside wall of duct 30 at the 6:00 position. A 4-inch diameter perforation 56 in liner 50 may be used at position 6:00. A 2-inch diameter perforation 56 in liner 60 at 6:00 and a 1-inch diameter perforation in liner 70 at 6:00. The 6-inch exit hole 40 may be overlapped by the 4-inch perforation of liner 50, effectively reducing the hole diameter to 4 inches and modifying subsequent volume and velocity of air flow from duct 30. Liner 60 with a 2-inch perforation 56 overlapping the 4-inch perforation of liner 50 again modifies the effective exit area and subsequent volume and velocity of air from duct 30. Liner 70 with 1-inch perforation overlaps the 2-inch perforation of liner 60 which overlaps the 4-inch perforation of liner 50 to further modify the effective exit area and subsequent volume and velocity of air from duct 30. Additional or various holes or perforations may be used and a hole need not always have a diameter or it may have an irregular edge.

Figure 2:
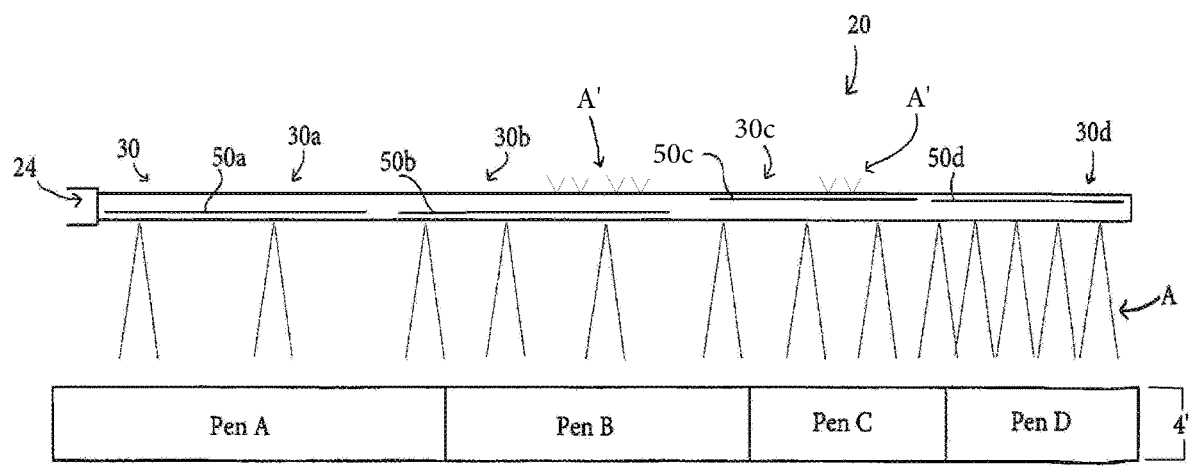
FIG. 2 is a side view of the system of FIG. 1.

In a further aspect with respect to FIG. 2, multiple liners 50 (for instance, liners 50*a*, 50*b*, 50*c*, 50*d*, etc.) may be utilized. It may be appreciated that more than one liner 50 may be oriented in an end-to-end position within a duct 30. In one aspect, a liner 50*a* may be positioned within duct 30 at a duct segment 30*a*. An additional liner 50, such as liner 50*b*, may also be included within duct. For instance, liner 50*b* may be positioned end-to-end with respect to liner 50*a*. In one aspect, liner 50*b* may be oriented at a duct segment 30*b*. It may be appreciated that additional liners 50 and duct segments 30 may be configured as desired and as determined appropriate by the facility designer, user or manager. It may be appreciated that each liner 50*a*, 50*b*, for instance, is independently operable. For instance, liner 50*a* may be oriented in a first position as shown in FIG. 3 whereas liner 50*b* may be oriented in a second position as shown in FIG. 4, or vice versa. As shown in FIG. 2, liner 50*a* is in a down position, liner 50*b* is in a down position, liner 50*c* is in an up position and liner 50*d* is in an up position. It may be appreciated that each of the liners is independent of the other and may be adjusted as desired.

It may be appreciated that the various liners 50*a*, 50*b*, 50*c*, 50*d*, etc., may be comprised of various materials, and may have varying permeabilties, perforation designs, perforation sizes and shapes and orientations. A designer may mix and match different liners 50, 60, 70 for layering. For instance, a liner 50*a* may be layered with a liner 60 such as generally shown in FIG. 13. Multiple liners may be positioned at each duct segment 30*a*, 30*b*, 30*c*, 30*d*.

In operation, the duct segment 30*a* associated with Pen A may be different compared to duct segment 30*b* associated with Pen B or the other pens. Different exit holes 40 may be used at different duct segments 30. In one non-limiting example with respect to FIG. 2, it may be appreciated that in a cool or cold or winter period all of the liners 50 may be oriented in a down position (shown with respect to segment 30*a* and segment 30*b*). With such orientation the flow of air from duct 30 is reduced or eliminated or otherwise adjusted for appropriate seasonal conditions.

In a further aspect and during the warm, hot or summer season, all of the liners 50*a*, 50*b*, 50*c* and 50*d* may be oriented in an upward position (shown with respect to segment 30*c* and segment 30*d*). With such orientation the flow of air from duct 30 is increased to provide comfort to the animals or persons in the facility. In one aspect the liner 50 or multiple liners 50*a*, 50*b*, 50*c*, 50*d* may or may not include perforations (or may or may not be permeable). In one aspect the liner 50 (or liners 50) may include perforations. The liner 30 may partially cover exit holes 40 (or some of them) to reduce the flow of air (or completely stop the air flow).

In one non-limiting aspect, segment 50*a* may include 4-inch diameter exit holes 40 spaced every 60 inches on center, segment 50*b* may have 4-inch diameter holes spaced every 48 inches on center, segment 50*c* may have 4-inch exit holes every 36 inches on center and segment 50*d* may have 4-inch exit holes every 30 inches on center. Other sizes, shapes (non-circular), patterns and orientations of holes 40 may be used. In a further aspect, top holes such as 42 may be ¼ inch for instance, while liner perforations may be ⅜" and exit holes 40 may be 2 inches.

In one aspect Pen A may contain younger/smaller livestock as compared to livestock in subsequent pens. For instance, Pen A may contain 10 calves each weighing approximately 150-200 pounds. Pen B may contain 10 calves each weighing approximately 300 pounds. Pen C may include 15 calves each weighing 400 pounds. Pen D may include 20 calves each weighing 500 pounds. Different size animals have different air flow needs and comforts. During the spring or fall season (with temperatures generally between 50-70 degrees F., the calves will require different air flow conditions as compared to larger animals in Pen B or subsequent pens. Liner 50*a* may be adjusted in the down position to cover the exit holes (or to allow a reduced and controlled amount of air to flow through perforations 56 and through exit holes 40 as desired). The liner 50*a* slows the velocity of air flow to 40 feet per minute (for instance) at 4 feet above the ground and drops the volume to 25 cfm per calf. With liner 50*b* positioned down, air flow in Pen B may be reduced to 30 cfm per calf and 100 feet per minute at four feet above the ground. Liners 50*c* and 50*d* may remain upward to provide greater air flow to the larger animals for comfort and without harming the smaller animals. The liners for the larger animals may remain upward for summer-like conditions. In one example, a duct may be configured such that in the summertime Pen A receives 45 cfm per calf and 300 feet per minute; Pen B 60 cfm per calf and 300 feet per minute at 4 feet above ground, and Pen C and/or Pen D 75 cfm per calf and 300 feet per minute velocity at 4 feet above ground. An operator may adjust the desired flow by having different sizes, shapes and patterns of exit holes 40 and/or different sizes, shapes and patters of perforations 56 and different or multiple liners 50*a*, 50*b*, 50*c*, 50*d*, and multiple liners 50, 60, 70 and combinations of all the forgoing. The fan or blower 24 may also be adjusted to control of air flow. The duct 30 may also be flipped or rotated to utilize the different exit holes 40 located in different portions of the duct (i.e., the first lower portion 32 may instead be oriented to have air exit upward while the second upper portion 34 may be oriented to have air exit downward, and vice versa). In this manner a facility may use a single duct for multiple seasons. The holes 40 in the upper portion of duct 30 may be smaller (or fewer in number and/or arranged differently in pattern) as compared to holes 40 in the lower portion of a duct 30, or vice versa. Flipping or rotating the duct thus allows for versatility of a single duct within a facility, and coupled with the adjustable liner (or liners), presents even further options for a facility manager to control the flow of air. The liners may or may not be permeable or perforated as desired. It may be appreciated that air flow may also exit upward from duct 30 (as shown generally in FIG. 2 with reference to Arrow A') and through air exit holes such as exit holes 42 to present an air flow such as represented by Arrow A. Flipping or rotating duct 30 in relation to fan 24 allows for switching the air flow (i.e., air flow of Arrow A would flow upward or generally upward; air flow of Arrow A' would flow downward or generally downward) while also allowing for even further control or switching by using the adjustment and features of inner liners 50.

Figure 15:
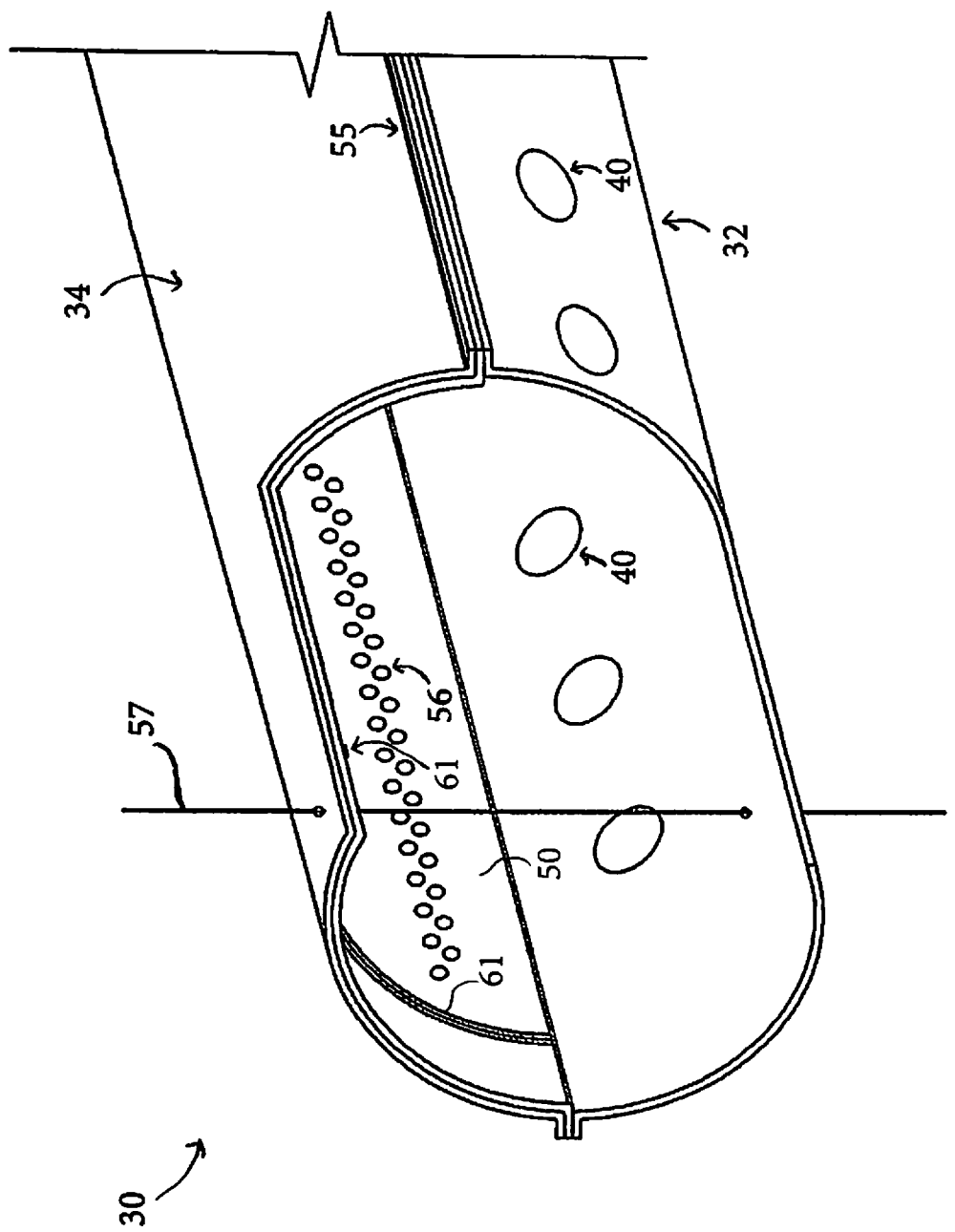
FIG. 15 is a partial cut-away section view of a duct in accordance with an aspect of the present invention.

In a further aspect of the invention with respect to FIG. 15, duct 30 includes moveable rod or stick 57 which in one aspect passes through duct layer and connects to liner 50. An operator may adjust liner 50 by moving stick 57. For instance, pulling downward of stick 57 (FIG. 15) will cause liner 50 to also move downward from second portion 34 to contact first portion 32 (See FIG. 16). As liner 50 adjusts to the downward position, the liner 50 at least partially covers at least one or some of the air exit holes 40. The holes or perforations 56 within liner 50 will overlay, at least partially, the holes 40 to allow some air flow through holes 40. It may be appreciated that a hole 56 may in part overlay hole 40 and may in part overlay first portion 32 (i.e., not all holes 56 need align perfectly with a hole 40). Holes 56 may have smaller area (i.e., area of the opening to the hole) compared to a hole 40 or holes 40, or in other aspects holes or perforations 56 may define exit area that is larger than a hole 40 or larger than each of the holes 40.

Figure 16:
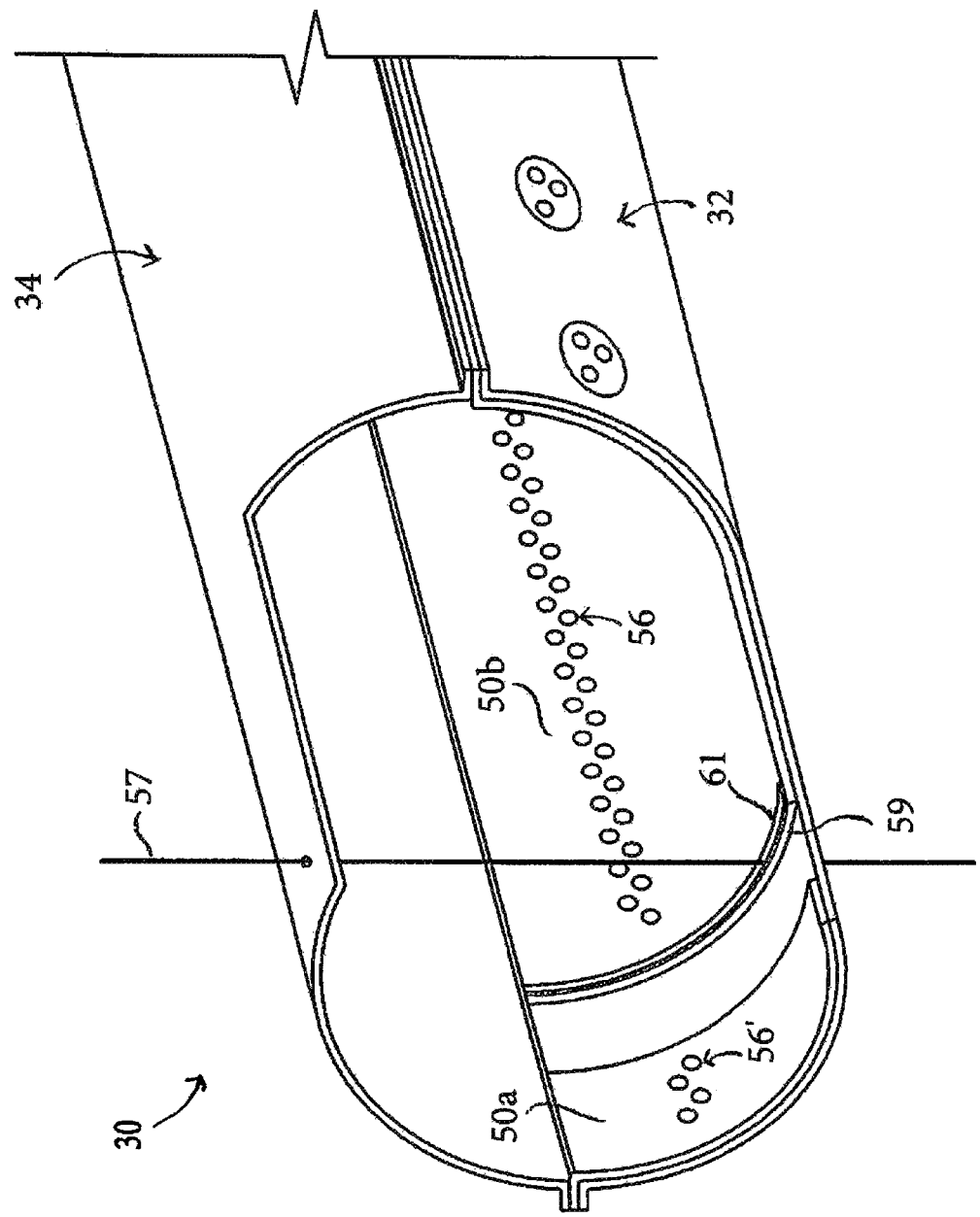
FIG. 16 is a partial cut-away section view of a duct in accordance with an aspect of the present invention.

With respect to FIG. 16, liner 50 includes a leading edge 59. The leading edge 59 is oriented proximal to the fan 24 as compared to the remaining aspect of liner 50 which extends downstream of leading edge 59. It may be appreciated that as air blows down through duct 30, there may be a tendency for the air to catch at leading edge 59 which may further tend to cause liner 50 to lift upward (or downward in the case of FIG. 15). In one aspect a strip such as a flexible strip 61 is associated with liner 50 and positioned at or adjacent leading edge 59. A strip 61 may bias the leading edge 59 firmly against the duct wall to reduce or prevent the tendency of air to penetrate between liner 50 and the first portion 32 of duct 30 as in FIG. 16. Strip 61 may snap into position for a firm fit. In this manner liner 50 will enjoy a firm setting against the inner surface of duct 30 until an operator decides to make an adjustment of the liner 50. Strip 61 may be sewn or connected to liner 50 and may also be presented in a pocket of liner 50 as desired. Strip 61 may be made out of a flexible magnetic strip and be attracted to a metal circular ring found either inside or outside the duct. In a further aspect, a leading edge 59, or material of liner 50 adjacent leading edge 59, may be equipped with a hook-and-loop component (for example Velcro™) to connect to a counterpart hook-and-loop component to secure the leading edge 59 in a fixed position. When an operator desires to adjust the liner 50 from an up-to-down orientation, or vice versa, the hook-and-loop connection may be disconnected and the liner 50 adjusted accordingly. Duct 30 may be configured with a port such as a hand port for a user to manually push the liner 50 into an alternative position by selectively releasing the hook-and-loop connection and then reconnect the hoop-and-loop connection once the liner has been adjusted. The user may also use a stick or other tool to accommodate disconnection and connection of the hook-and-loop connection for selected adjustment of the liner. In further aspects, a stick 57 (and/or hook-and-loop connectors) may be used in conjunction with the multiple liners 50, 60, 70, etc., as desired.

With further reference to FIG. 16, a second liner 50*a* is oriented in-line and upstream of liner 50*b*. A separate stick

57 may be used to independently adjust liner 50a. It may be appreciated that holes or perforations 56' shown on liner 50a may also be of a different variety or configuration (i.e., size, style, orientation, spacing, etc.) as compared to the holes or perforations 56 (i.e., configuration) of liner 50b (See also FIG. 2). It may also be appreciated that holes 42 or a first set of air exit holes of duct 30 may comprise a first configuration which is different, at least in part, compared to a configuration of holes 40 or of a second set of air exit holes.

Figure 17:
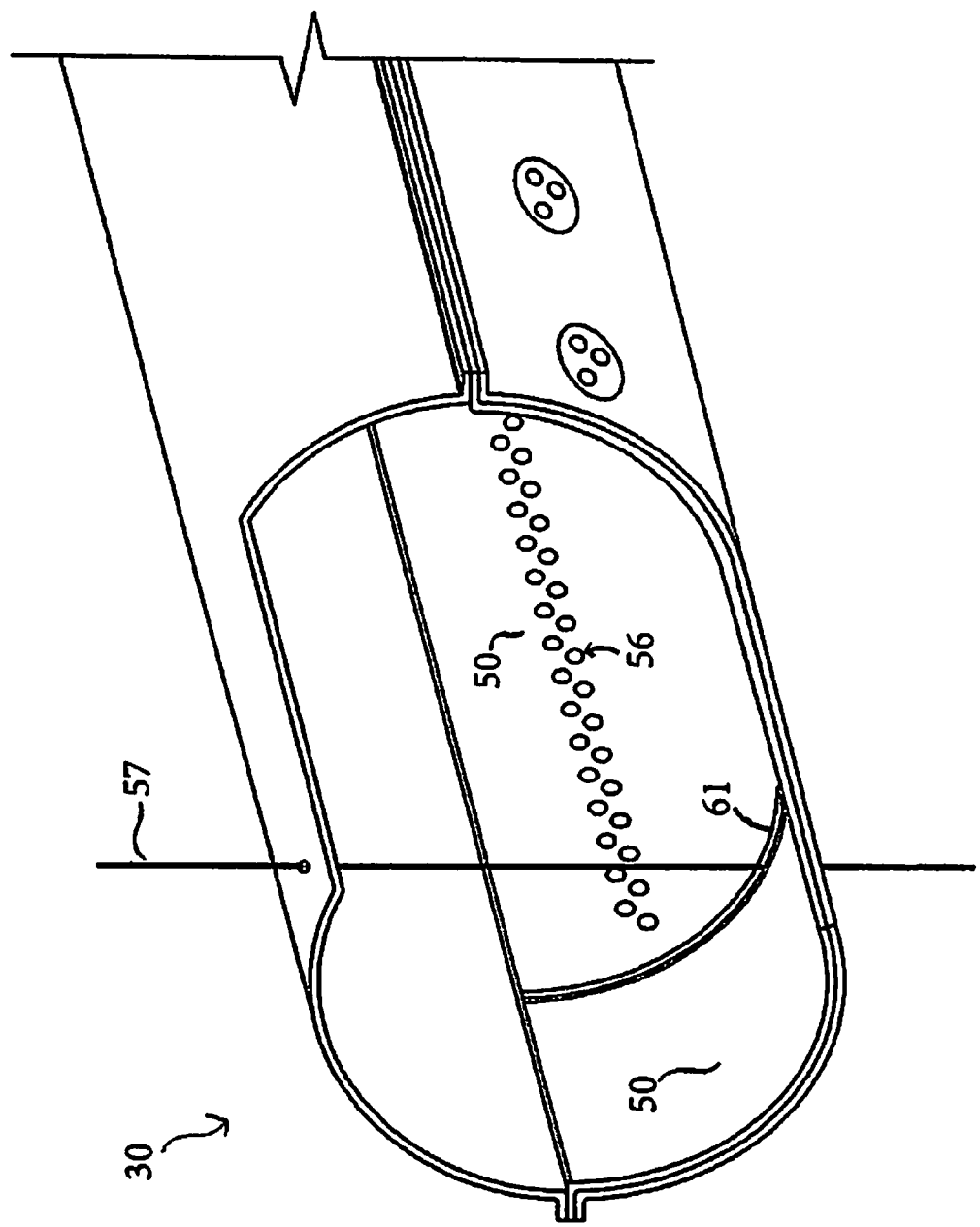
FIG. 17 is a partial cut-away section view of a duct in accordance with an aspect of the present invention.

In a further aspect with respect to FIG. 17, liner 50 may include a strip 61 positioned at a location other than adjacent a leading edge. FIG. 17 also shows a liner 50 where holes or perforations 56 are oriented at a segment of liner 50 demonstrating that different varieties of segment of a liner 50 may be used as desired. Further, multiple sticks 57 may also be used to adjust a single liner 50 as desired.

Applicant appreciates that with the ability to better control the air flow, the animals experience better health and comfort. The ability to swiftly regulate the volume and velocity of air allows an operator to better guard against livestock experiencing pneumonia and also provides more comfortable conditions. The air flow may also be controlled to assist in comfort by removal of flies from creating discomfort. Applicant appreciates that such comfort enhancing aspects improve the overall health of animals and lead to increases in weight gain and production and reduction of medical care and servicing unhealthy stock.

In further aspects system 20 may be configured with remote control or automatic control adjustment devices. For instance, each liner 50 may be automatically adjusted depending on conditions. Sensors and solenoids and servo-motors may be used to automatically adjust liners 50, 60, 70 based upon changing conditions. A software program and or mobile application program may be set to initiate the liner orientation and automatically adjusted based on user input and/or sensor data. For instance, the liners 50, 60, 70 may be adjusted automatically based on changes in temperature, humidity, wind, pen layout changes, changes to the make-up or type of livestock, etc. A database may collect the information and duct or liner set-up or orientations. The collected data may be analyzed or utilized to adjust for optimal conditions. It may be appreciated that liners 50, 60, 70 may be mixed and matched for specific regulation or control of individual pens or the entire facility. A warning system may be used in conjunction with the control and sensing systems to warn in the event of faulty liners or faulty adjustment mechanisms. Wireless communication of data and control signals may be used for system 30.

It may be appreciated that duct 30 may be oriented at different positions within a facility (and may depend on other systems such as lighting or other structures). A duct 30 is not limited to orientation down the middle of a facility but may also be positioned at a side of a barn wall. A duct 30 may also be connected or include a branch or branches such that the branches are configured to extend from elongated duct 30 at different angles.

It may be appreciated that duct 30 may also include a rigid duct having exit holes. For instance, the liner 50 may also be used within a metal duct system (including cylindrical shaped (or rectangular or other shape) metal or rigid ducts.

It may be appreciated that an operator of system 20 may make quick decisions about the control aspects and manipulate the various liners with little effort to achieve desired results (either manually or automatically). Various method aspects are available for utilizing a duct 30 or system 20 of the invention. In one method aspect, the duct 30 described above may be utilized to distribute air in a facility. In one aspect, where duct 30 includes a first portion 32 having one set or configuration of holes 40 and a second portion 34 having a different configuration of holes 40, 42, the duct 30 is rotated. For instance, the duct is rotated such that orientation of the first portion 32 changes from a downward-facing position (or a generally downward-facing position) to an upward-facing position (or generally upward-facing position) or vice versa. Rotation may occur by disconnecting hooks which suspend the duct 30 from a line or ceiling and rotating the duct 180 degrees, for instance, and then reconnecting the duct 30 for suspension. Heretofore there has been no such rotation of a duct with portions having different hole configurations (or no hole configuration) and which also includes an inner adjustable liner, whether the liner was solid or permeable.

As noted above, liner 50 is permeable and in some aspects perforations provide the permeability while in other aspects the liner is naturally permeable. Applicant appreciates that openings or holes 56' may be present naturally within liner 50 or may be created by perforation or other action. Non-limiting examples of how liner 50 may be perforated include perforation by cutting, or by laser, or perforation with knife or blade cuts, needles, punches or other penetration tools, tearing, acid application or other material removal means, and/or 3D printing or other additive means resulting in a layer having holes or being permeable. In some aspects a perforation is created such that the perforation is generally circular, such as with a laser, needle, or other cutting or removal. In the case of a perforated circular hole, in one aspect the diameter of the hole measures one inch or greater, and in other aspects the diameter of the perforation measures one inch and smaller, such as a measure as low as $\frac{1}{128}$ inches. Such an opening, while small, nonetheless prevents liner 50 from being airtight and allows air to flow through liner 50 to provide a desired air flow impact in the environment to be treated. A similar hole may also be utilized without the hole being circular, i.e., different shapes are contemplated. Larger area holes may also be used as desired to provide an increased flow volume for a desired application. Multiple holes may also be provided in a given area to increase or control the amount of air flow as desired. In one aspect holes 56' may comprise an area no less than an area of a circle having diameter $\frac{1}{128}$ inches; and in another example a hole 56' has an area at least as great as a circle having diameter of ¼ inches. In an agricultural setting, a perforation 56 or hole 56' having an opening area less than that of a ¼ inch diameter circle may fill or clog with dust or other matter.

Duct 30 may be made of components having different permeabilies. Duct 30 may have varying permeability along its length. In one aspect air exit holes 40 are perforations. In other aspects air exit holes 40 are inherent in the material of duct 30 or may be holes created in the material. In one aspect a portion of the liner 50 which overlays an air exit hole 40 has a permeability of no less than 0.4 CFM per square foot. In further aspects, a portion of the liner 50 which overlays an air exit hole 40 is configured to allow at least 0.1 CFM of air flow through the air exit hole 40. Such minimum permeability assures the liner 50 is not substantially airtight and provides some level of air permeability for air flow or anti-condensation. A greater permeability, i.e., greater than 0.4 CFM per square foot can also be used as desired. In one non-limiting example, a portion of liner 50 has a permeability of 5 CFM per square foot or greater than 5 CFM per square foot. Such permeability can be created due to an inherent property of the material itself or due to a manufacturing process. The material of liner 50 may be naturally porous or may include perforations or other holes. In non-limiting examples liner 50 may also be made of fabric, woven fabric, non-woven fabric, plastic, mesh, HDPE, carbon fibers, nylon, burlap, canvas, and/or other materials. The air flow in the environment may be adjusted as desired by designing or modifying the permeability of the liner 50 and/or the amount of openings or holes 40, 42 in the duct 30.

In one aspect liner 50 is configured to have a permeability of at least 0.4 CFM per square foot. For instance, the material used to make liner 50 may have such permeability upon manufacture, or the permeability can be created by making holes. In one aspect the entire liner 50 will have a permeability of at least 0.4 CFM per square foot. In other aspects such permeability will be present at portions of the liner 50 which align with exit holes 40. Liner 50 may be selectively configured with some portions or areas having permeability greater than other portions or areas. In many applications the permeability will be much greater than 0.4 CFM per square foot. For instance, a hole 56' or perforation 56 may comprise a 1 inch diameter hole formed within liner 50. The rate of air flow through such hole will be significantly greater, for instance, compared to the rate of air flow through a space or hole 56' resulting from a woven fabric (maintaining all other aspects constant, such as fan speed, duct diameter, duct length, amount of air exit holes, material thicknesses, etc.).

In a further aspect system 20 may be used for delivery of vapors or gasses within the air which flows through duct 30, and in other aspects water or other fluids or liquids may flow through duct 30 in accordance with the invention. In one non-limiting example duct 30 conveys gasses containing sanitation chemicals including but not limited to chlorine dioxide or insecticides or herbicides.

In further reference to FIG. 17, a leading edge of liner 50 may be held into position by hook-and-loop connectors which release, for instance, upon activation of stick 57. For instance, hook-and-loop connectors may be secured at or adjacent the leading edge of liner 50, positioned generally at or near strip 61. In other aspects, strip 61 may comprise a relatively stiff piece of material such as plastic formed into a partial circle and which is configured to flex and adhere to the inner surface of duct 30. When stick 57 is adjusted, strip 61 raises or lowers and sets into a friction holding position to secure the leading edge of liner 50 against the inner side of duct 30. Strip 61 may also comprise a metal or a steel ring or partial ring which is flexible and adjusts to the inner surface of duct 30 to secure the leading edge of liner 50 against the inner surface. In one aspect stick 57 passes through strip 61. Strip 61 may be placed within a pocket formed at leading edge of liner 50. Such pocket may be sewn to receive strip 61. In a further aspect, a magnet or magnets are provided at leading edge of liner 50, such as by placement of a magnet at strip 61 or making strip 61 a magnet. A metal object or corresponding magnet may be positioned at inner surface (or outer surface) of duct 30 to achieve magnetic attraction of liner 50 at the leading edge to position liner 50 firmly against duct 30. When duct 50 is adjusted (i.e., from a bottom-to-top orientation), the magnet or magnets will release and reconnect at the adjusted position. A magnet may be present in the form of a small strip-magnet, for instance. Magnets may also be positioned the length of liner 50 or duct 30 to accommodate firm holding of liner against duct 30. Various pockets to hold magnets or metal objects may be provided in liner 50 for magnetically temporarily securing liner 50 against duct 30.

In a further aspect a rotation of duct 30 is achieved by use of a collar mechanism. Duct 30 may be equipped with a collar that surrounds an end of duct 30 and which integrates with a shroud of a fan which supplies air flow to the duct. The fan, which is typically positioned on a wall has a terminating shroud upon which a collar integrates. The collar is connected to the duct, such that rotation of the collar about the shroud results in the duct also being rotated or "flipped." An operator may therefor both conveniently rotate or flip the duct 30 and also adjust the internal liner 50. Because the duct 30 may be configured with different hole patterns and with a liner or liners having desired permeability, a variety of flow characteristics may be achieved with a single system.

Figure 18:
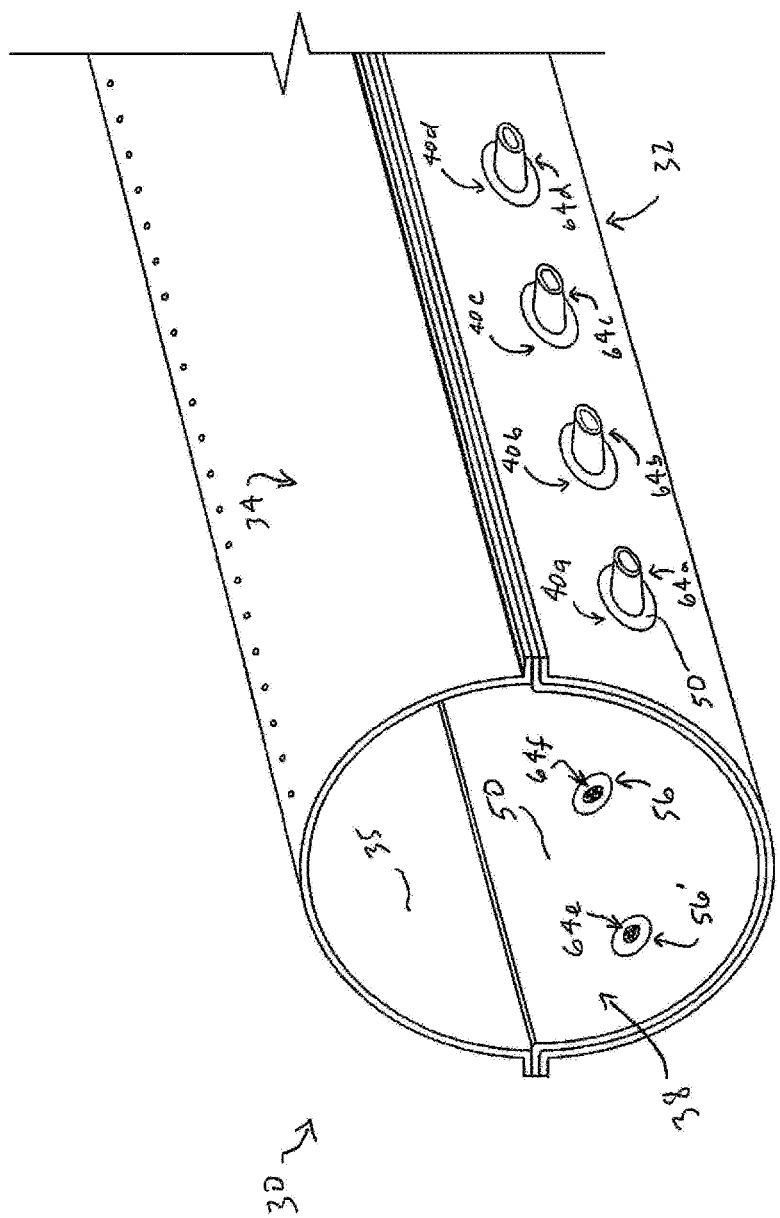
FIG. 18 is a partial perspective section view of a further aspect of the invention.
Figure 19:
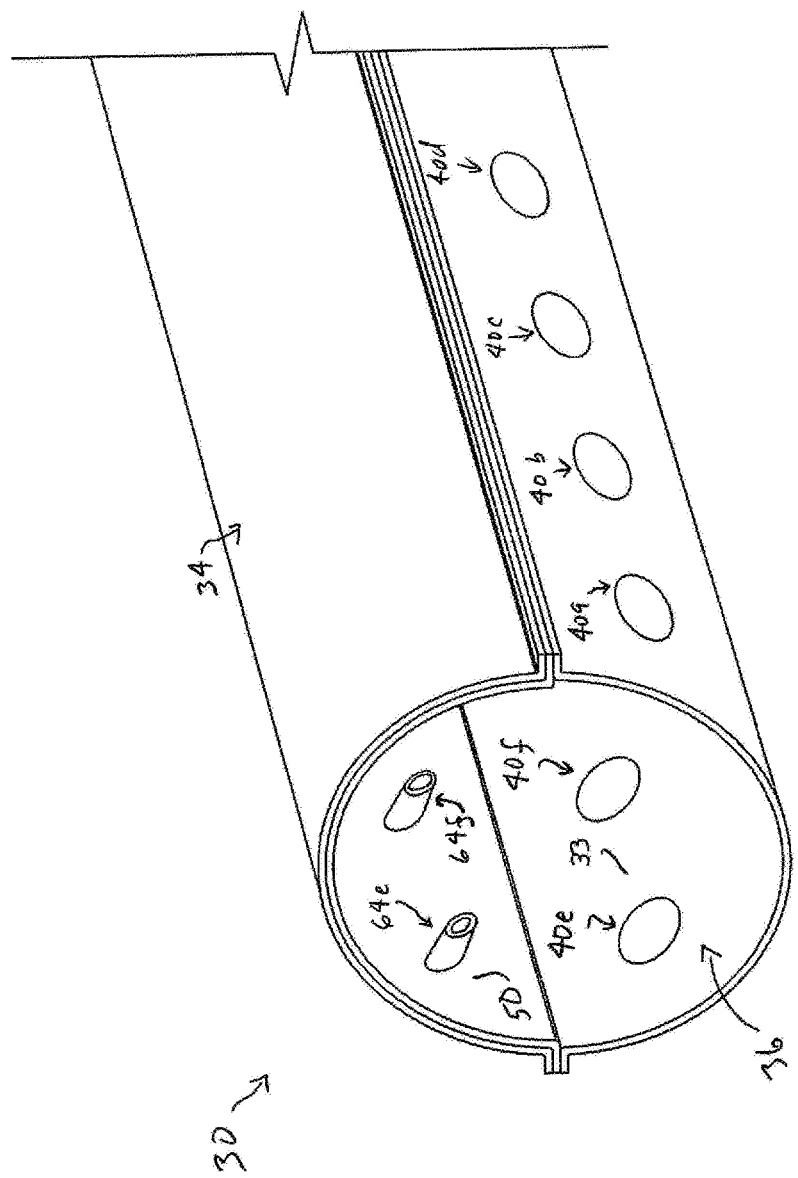
FIG. 19 is a partial perspective section view of a further aspect of the invention.

In a further aspect with respect to FIG. 18 and FIG. 19, duct 30 includes liner 50 configured to influence the direction and/or velocity of air as the air exits the air exit holes 40. In one aspect liner 50 includes nozzles 64. Nozzles 64 are connected to liner 50 such that nozzles 64 extend into and/or protrude from or through exit holes 40. In one aspect nozzles 64 comprise a tube-like structure to allow air to pass from within duct 30 to the exterior of duct 30. Nozzles 64 may be adjustable to adjust the direction and amount of air which flows through nozzle 64. Nozzles 64 may rotate to deflect air in different directions. Different size nozzles 64 may be used to accommodate different flow rates. Nozzles 64 may also be selectively closed. In one aspect the nozzles 64 protrude from exit holes 40 when liner sheet 50 is oriented in the down position as generally shown in FIG. 18, for instance. Alternatively, liner sheet 50 is adjusted to press against inner surface 35 of the second portion 34 such that nozzles 64 extend into first longitudinal compartment 36. For instance, nozzle 64e will protrude into compartment 36 when liner 50 is in the upward orientation, while in the downward orientation shown in FIG. 18 nozzle 64e will protrude through an air exit hole of the second portion 34. When liner 50 is in the upward orientation, nozzle 64a, for instance, will protrude into longitudinal compartment 36. The size and location of air exit holes 40 and of nozzles 64 can be adjusted to fit a desired application. In one aspect nozzles 64 are made of molded plastic and with flexibility to bend or adjust about duct 30 and the edges of exit holes 40 to fit through exit holes 40. In another aspect nozzles 64 are made of fabric. Nozzles 64 may also comprise a partial tube such as a half-tube or quarter-tube or other portion of a tube.

Figure 20:
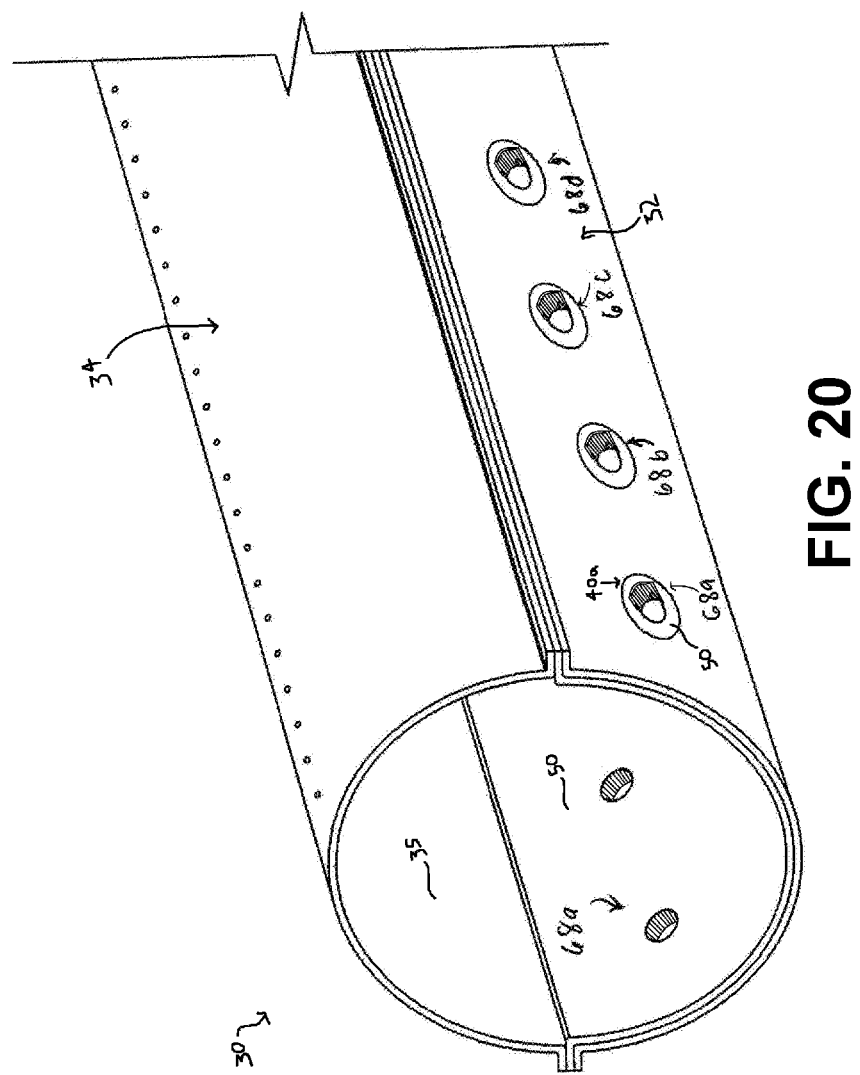
FIG. 20 is a partial perspective section view of a further aspect of the invention.
Figure 21:
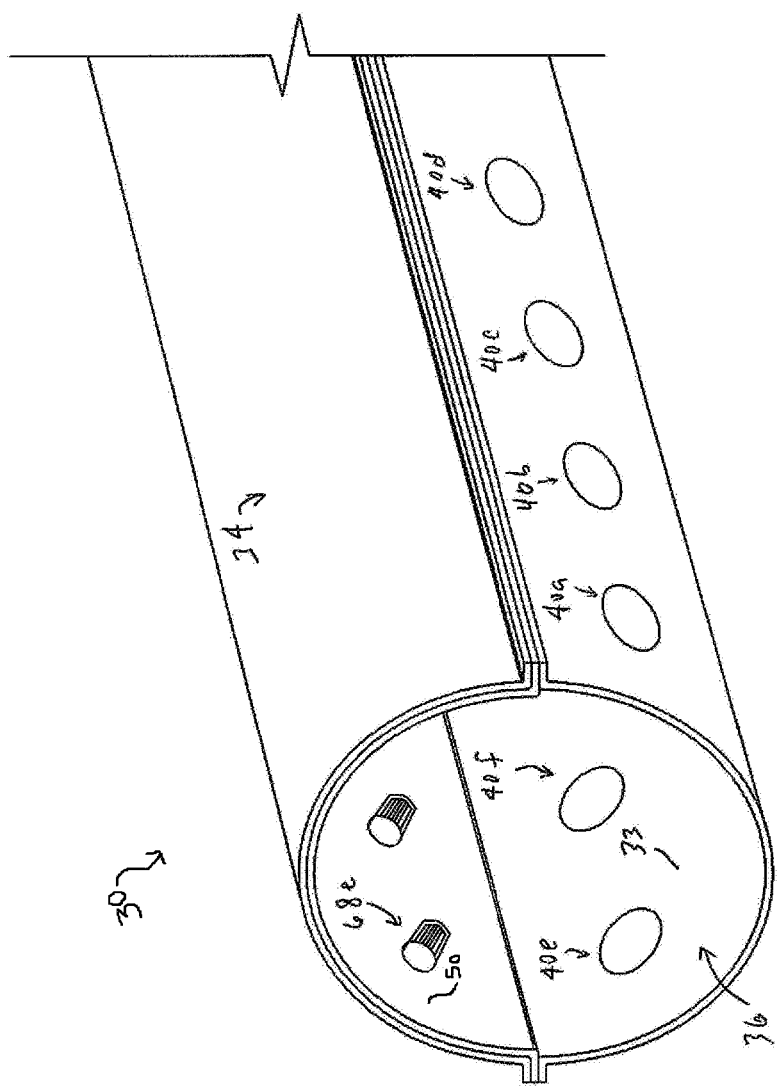
FIG. 21 is a partial perspective section view of a further aspect of the invention.

In a further aspect with reference to FIG. 20 and FIG. 21, duct 30 has a liner 50 including wings 68. Wings 68 are connected to liner 50 such that wings 68 extend into and/or protrude from or through exit holes 40. In one aspect wings 68 comprise a fan-like structure to allow air to pass from within duct 30 to the exterior of duct 30 and to be deflected as the air passes through or once the air passes through exit hole 40. Wings 68 may be adjustable to adjust the direction and amount of air which flows through or about a wing 68. Different size wings 68 may be used to accommodate different flow rates. In one aspect the wings 68 protrude from exit holes 40 when liner sheet 50 is oriented in the down position as generally shown in FIG. 20, for instance. Alternatively, liner sheet 50 is adjusted to press against inner surface 35 of the second portion 34 such that wings 68 extend into first longitudinal compartment 36. For instance, wings 68e will protrude into compartment 36 when liner 50 is in the upward orientation. While in the downward orientation shown in FIG. 20 wings 68 will protrude through an air exit hole of the second portion 34. When liner 50 is in the upward orientation, wings 68, for instance, will protrude into longitudinal compartment 36. The size and location of air exit holes 40 and of wings 68 can be adjusted to fit a desired application. In one aspect wings 68 are made of molded plastic and with flexibility to bend or adjust about duct 30 and the edges of exit holes 40 to fit through exit hole 40. In another aspect wings 68 are made of fabric. In a further aspect liner may include both nozzles 64 and/or wings 68.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular AIR DUCT SYSTEMS AND METHODS OF AIR FLOW CONTROL herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims.

What is claimed is:

1. An air flow control system comprising:
an elongated flexible duct having a first set of air exit holes positioned along a first portion of the duct; and
a flexible liner sheet having liner holes, the liner sheet positioned within and extending longitudinally along the duct, the liner sheet having opposite longitudinal edges connected to the duct, the liner sheet in part defining a first longitudinal compartment and a second longitudinal compartment within the duct such that air directed longitudinally along the first longitudinal compartment escapes through the air exit holes in a first general direction of predominant air flow exiting the duct and when directed along the second longitudinal compartment forces the liner sheet to be in substantial contact with an inner surface of the first portion of the duct containing the air exit holes, the liner sheet configured such that air escapes through at least one of the liner holes aligned with at least one of the air exit holes and such that a direction of predominant air flow exiting the duct is maintained in the first general direction irrespective of whether the liner sheet is in substantial contact with the inner surface of the first portion.

2. The system of claim 1 where the liner sheet is configured to influence a direction and/or velocity and/or volume of air flow as the air exits the at least one of the air exit holes.

3. The system of claim 2 where the liner sheet comprises wings, at least one of the wings configured to protrude through the at least one of the air exit holes.

4. The system of claim 2 where the liner sheet comprises nozzles, at least one of the nozzles configured to protrude through the at least one of the air exit holes.

5. The system of claim 1 further comprising at least another flexible liner sheet within the duct and extending longitudinally along the duct.

6. The system of claim 1 where the at least one of the liner holes is a perforation.

7. The system of claim 1 where the at least one of the liner holes has an opening area no less than an area of a circle having diameter of 1/128 inch.

8. The system of claim 1 where the at least one of the liner holes has an opening area at least as great as an area of a circle having a diameter of 1/4 inch.

9. The system of claim 1 where the liner sheet has a permeability of at least 0.4 CFM per square foot.

10. The system of claim 1 where the liner sheet is configured to overlap at least one of the exit holes to allow at least 0.1 CFM of air flow through the at least one air exit hole.

11. The system of claim 1 further comprising a second set of air exit holes positioned along a second portion of the duct such that air directed longitudinally along the second longitudinal compartment escapes through the second set of air exit holes positioned along the second portion and when directed along the first longitudinal compartment forces the liner sheet against the inner surface of the second portion of the duct containing the second set of air exit holes.

12. The system of claim 11 where the air exit holes of the second set of air exit holes are configured differently as compared to the air exit holes of the first set of air exit holes.

13. The system of claim 12 where at least one of the liner holes has an opening area greater than an opening area of at least one of the air exit holes.

14. The system of claim 11 where the duct and the liner sheet are configured such that a dominant air flow exits the first set of air exit holes in the first general direction with the liner sheet against the inner surface of the second portion, and exits the second set of air exit holes in the first general direction with the liner sheet against the inner surface of the first portion with the duct rotated such that the first set of air exit holes is positioned opposite the first general direction.

15. The system of claim 11 where at least one of the liner holes aligns with at least one of the air exit holes of the second set of air exit holes such that air exits through the at least one of the liner holes and through the at least one of the second set of air exit holes.

16. The system of claim 11 where the liner sheet is configured such that air escapes simultaneously through at least one of the first set of air exit holes and at least one of the second set of air exit holes when the liner is pressed against the inner surface of either the first portion or the second portion.

17. The system of claim 1 where the longitudinal edges extend longitudinally along the duct.

18. The system of claim 1 where at least a portion of the longitudinal edges are connected longitudinally to the duct.

19. The system of claim 1 where at least a portion of the longitudinal edges are connected along a longitudinal seam of the duct.

20. A method of distributing air utilizing the system of claim 11, the method comprising rotating the duct such that an orientation of the first portion of the duct changes from a generally upward-facing position to a generally downward-facing position with the liner sheet adjusted to press against the second portion of the duct to maintain a downward air flow direction through the first set of air exit holes, the downward air flow direction consistent with the first general direction of predominant air flow exiting the duct.

21. A method of distributing air utilizing the system of claim 12 comprising a step of adjusting the liner sheet to maintain the airflow in the first general direction of predominant air flow.

22. An air flow control system comprising:
an elongated flexible duct having a first set of air exit holes positioned along a first portion of the duct; and
a flexible liner sheet having liner holes with at least one of the liner holes being a perforation, the liner sheet positioned within and extending longitudinally along the duct, the liner sheet having opposite longitudinal edges connected to the duct, the liner sheet in part defining a first longitudinal compartment and a second longitudinal compartment within the duct such that air directed longitudinally along the first longitudinal compartment escapes through the air exit holes in a first general direction of predominant air flow exiting the duct and when directed along the second longitudinal compartment forces the liner sheet to be in substantial contact with an inner surface of the first portion of the duct containing the air exit holes, the liner sheet configured such that air escapes through at least one of the liner holes aligned with at least one of the air exit holes, the duct configured such that a direction of predominant air flow exiting the duct is maintained in the first general direction irrespective of whether the liner sheet is in substantial contact with the inner surface of the first portion.

23. A method of distributing air comprising:
utilizing an air flow control system comprising an elongated duct having a first set of air exit holes positioned along a first portion of the elongated duct and a second set of air exit holes positioned along a second portion of the duct, the first set of air exit holes being configured differently compared to the second set of air exit holes, a flexible liner sheet positioned within and extending longitudinally along the duct, the liner sheet having opposite longitudinal edges connected to the duct, the liner sheet in part defining a first longitudinal compartment and a second longitudinal compartment within the duct such that air directed longitudinally along the first longitudinal compartment escapes through the first set of air exit holes in a first general direction of air flow exiting the duct with a first set of air flow characteristics and when directed along the second longitudinal compartment forces the liner sheet to be in substantial contact with an inner surface of the first portion of the duct such that air directed longitudinally along the second longitudinal compartment escapes through the second set of air exit holes in a second general direction of air flow exiting the duct with a second set of air flow characteristics;
rotating the duct such that orientation of the first portion of the duct changes from a generally downward-facing position to a generally upward-facing position; and
adjusting the liner sheet from contacting the inner surface of the second longitudinal compartment to contacting the inner surface of the first longitudinal compartment such that air exits the second set of air exit holes with the second set of air flow characteristics while maintaining air flow in the first general direction.

24. The method of claim 23 where the step of adjusting the liner sheet causes a predominant air flow exiting the duct to be maintained in the first general direction.

* * * * *